United States Patent [19]

Skyba

[11] Patent Number: 4,648,483
[45] Date of Patent: Mar. 10, 1987

[54] CAM LOCK

[76] Inventor: Helmut K. Skyba, Rte. 2, Box 330, Wild Rose, Wis. 54984

[21] Appl. No.: 794,002

[22] Filed: Nov. 1, 1985

[51] Int. Cl.⁴ .................. A01M 31/02; A45F 3/26
[52] U.S. Cl. .................................... 182/187; 182/134
[58] Field of Search ............... 182/187, 188, 135, 136, 182/134; 24/170, 191, 134 R, 132 R

[56] References Cited

U.S. PATENT DOCUMENTS

| 557,800 | 4/1896 | Gray | 24/134 R |
|---|---|---|---|
| 1,250,876 | 12/1917 | Hicks | 24/134 R |
| 2,442,266 | 5/1948 | Davis | 24/170 |
| 2,608,174 | 8/1952 | Sponenburg | 24/134 R |
| 3,872,550 | 3/1975 | Yang | 24/191 |
| 3,927,733 | 12/1975 | Wurn | 182/187 |
| 3,955,645 | 5/1976 | Dye | 182/135 |
| 4,542,884 | 9/1985 | Dodge | 182/5 |

*Primary Examiner*—Reinaldo P. Machado
*Attorney, Agent, or Firm*—Fuller, Puerner & Hohenfeldt

[57] ABSTRACT

A cam lock suitable for use in a wide variety of rope and belt tightening apparatus including boat anchor systems and tree seats and climbing aids including a cam wheel with various spring and bushing arrangements and a lever for remote control.

13 Claims, 15 Drawing Figures

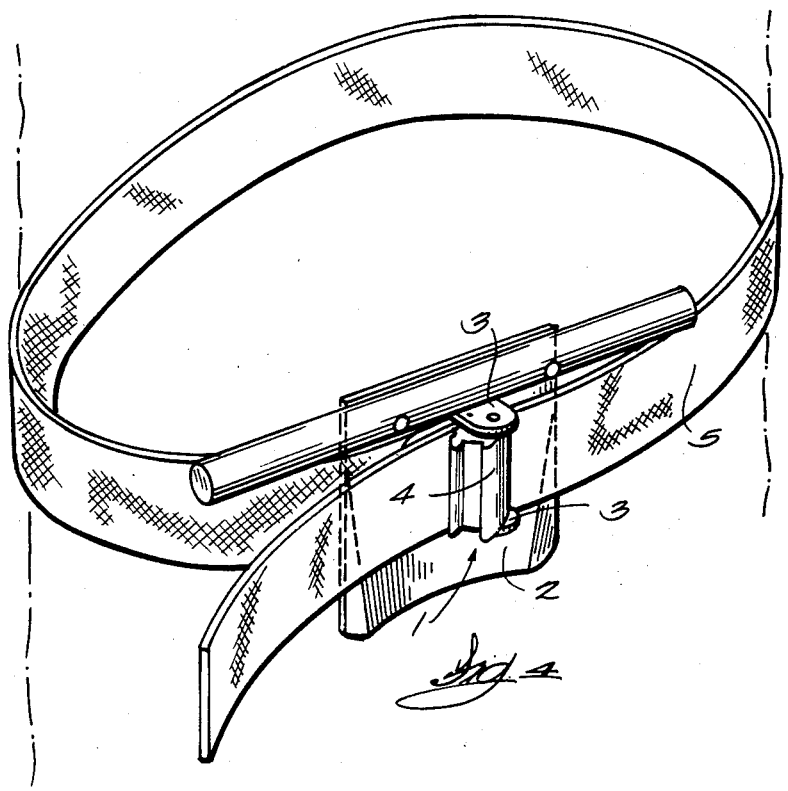
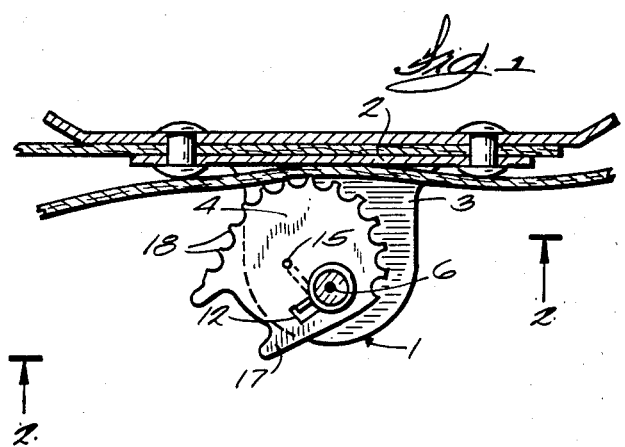
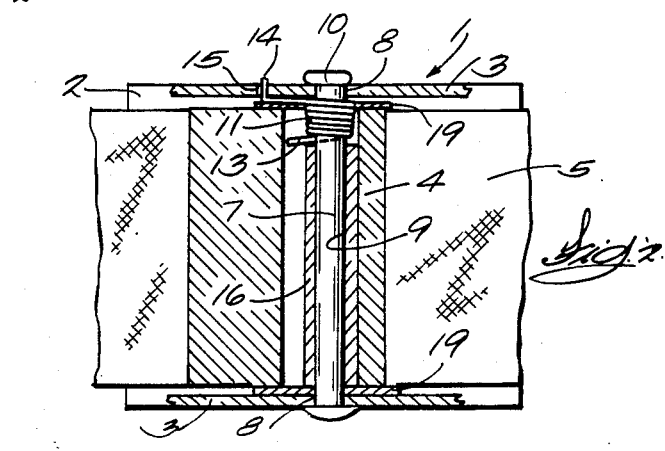
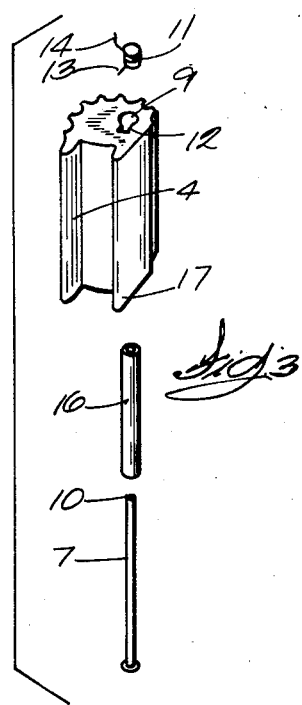

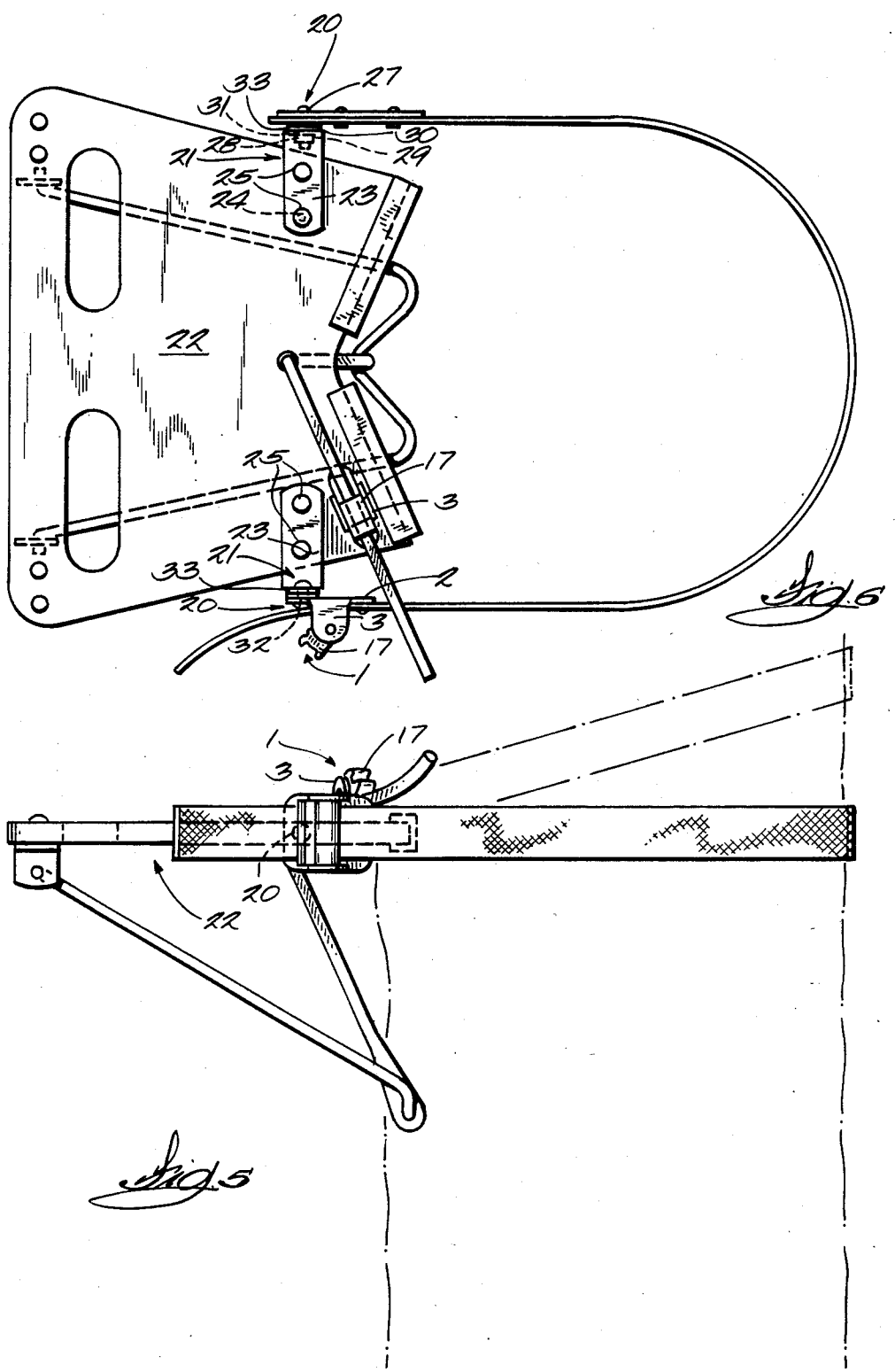

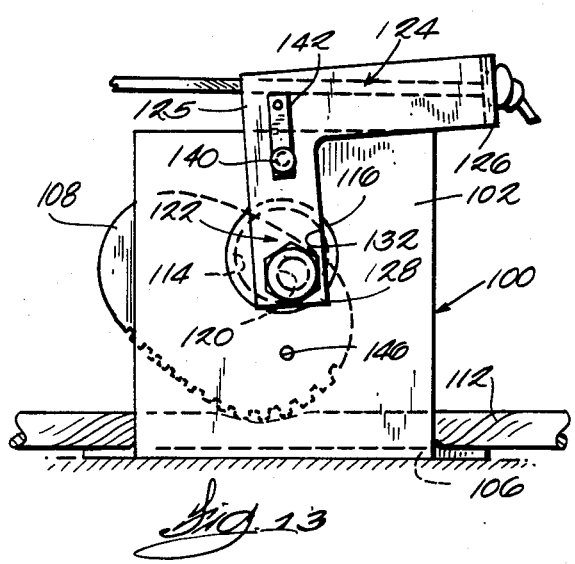
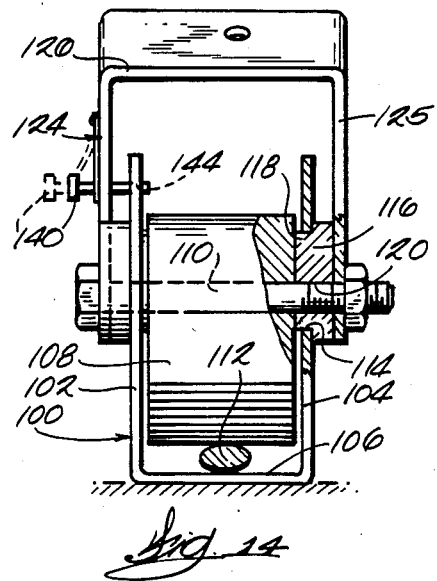
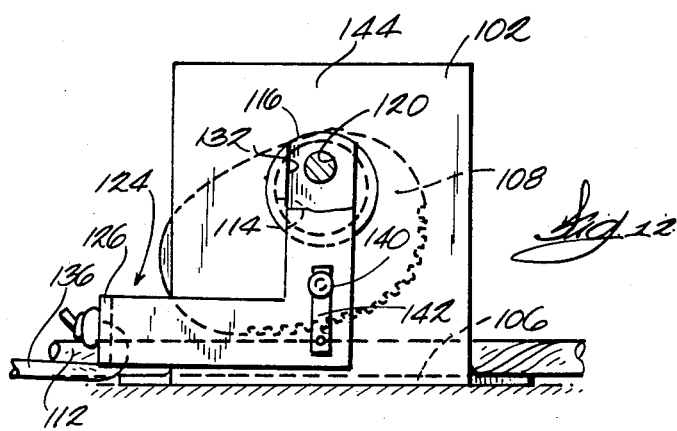
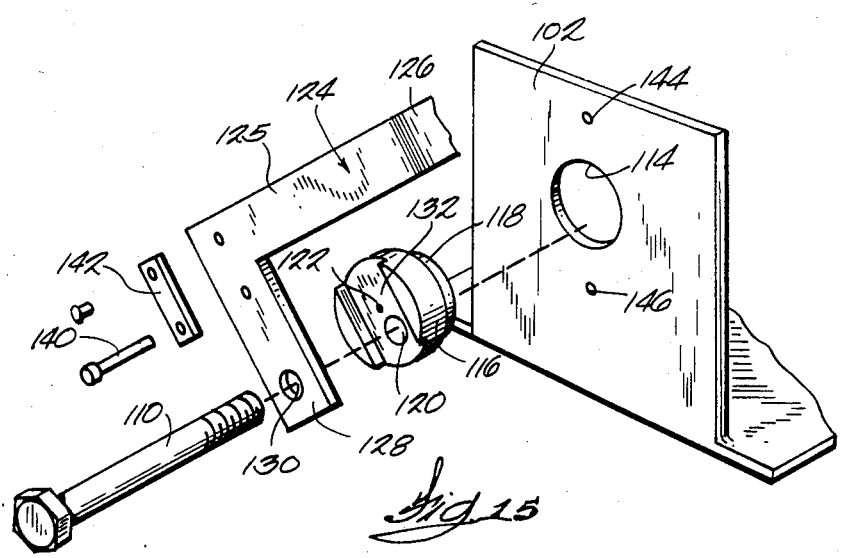

CAM LOCK

BACKGROUND OF THE INVENTION

1. Field of the Invention

This invention relates to a cam lock device for a rope or belt to provide adjustment in the length of a loop.

2. Description of the Prior Art

The cam lock device is useful in a tree stand or seat device which requires a loop to connect the stand to the tree. U.S. Pat. No. 3,955,645 is illustrative of patents on this subject. The cam lock can also be employed as a cleat for an anchor rope in a manner similar to that disclosed in U.S. Pat. No. 2,608,174.

SUMMARY OF THE INVENTION

A cam locking device is provided which comprises a base portion having two leg portions capable of holding an eccentrically mounted cam wheel. The cam wheel pivots on a pin passing through holes in each of the leg portions. The cam is of such diameter and positioned eccentrically such that it cannot rotate in a complete 360 degree arc without jamming a portion of the rope or strap between the cam and the base portion. Ridges on the cam periphery increase the gripping strength of the cam lock. Other ridges or protrusions on the cam periphery allow the cam to be manually gripped and released, thus facilitating strap or rope adjustment of the diameter of the loop around the tree and during ascension or descension of the tree seat. The cam lock mechanism also includes a spring to bias the cam into a rope engaging position and a bushing to hold the spring in place. The aforementioned spring mechanism insures that the cam is always in a ready-to-lock position unless physically held otherwise. Various embodiments of the cam locking device are disclosed. The base portion is either bolted to the tree stand or attached to the tree stand via a pivot, allowing the strap to be pivoted to facilitate the ascending or descending motion of the stand.

BRIEF DESCRIPTION OF THE DRAWINGS

In the drawings:

FIG. 1 is a side elevational view in partial section of the cam lock base fastened to a tree climbing aid;

FIG. 2 is a view taken along line 2—2 of FIG. 1;

FIG. 3 is an exploded view of the cam wheel and axis;

FIG. 4 is a perspective view of the hand operated climbing aid with strap and cam lock;

FIG. 5 is a side perspective view of a tree stand seat with strap attachment and cam lock;

FIG. 6 is a plan view of the tree stand seat with cam lock, pivots and strap.

FIG. 12 is a side elevational view of a further modified embodiment with a remote control lever.

FIG. 13 is a view similar to the view shown in FIG. 12 with the cam in a rope engaged position.

FIG. 14 is a fragmentary sectional end view of FIG. 13.

FIG. 15 is a fragmentary exploded view of the device shown in FIGS. 12, 13 and 14.

DETAILED DESCRIPTION OF THE PREFERRED EMBODIMENT

Figure 8:
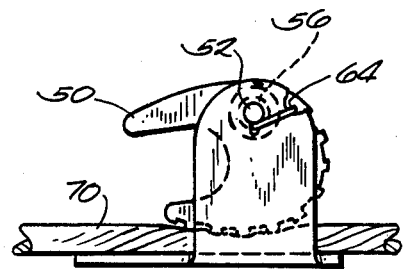
FIG. 8 is a side elevational view of a modified embodiment of the cam lock.

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

Referring to the drawings, FIGS. 1, 2 and 4 show the use of the cam lock to secure the belt on a tree climbing aid. Reference character 1 generally indicates a cam lock device comprising a base plate 2 with two upstanding legs 3 at right angles with the base plate 2. The base plate is secured to strap 5 by rivets holding an eccentric cam wheel 4 between them. A strap 5 encircling a tree is positioned between the two leg portions 3 and between the base plate 2 and the wheel 4. The wheel 4 has an off-center eccentric axis 6, which is placed such that the wheel 4 cannot rotate through a 360 degree circle without jamming or engaging against the strap 5 and base 2 thus precluding strap movement in one direction when jammed. The axis is provided by a cylindrical pin 7 inserted through one leg opening 8, through the cam wheel opening 9 or aperture and then through the second identical leg 8 opening. The end 10 of pin 7 may be flattened to secure the pin in position. A coil spring 11 is arranged around one end of the pin. The outside diameter of the spring is less than the diameter of aperture 9 and the coil of spring 11 is located inside aperture 9. End 13 of the spring is secured in a slot 12 in the wheel. The other end of the spring 14 attaches to an opening 15 in one of the legs 3. The bushing 16 has an axial length less than the thickness of the cam wheel. The spring 11 is held in axial position adjacent to the leg by a bushing 16 on pin 7. The spring torques the cam wheel 4 against the strap 5 and base plate 2. Tension upon the strap 5 in one direction will cause the cam wheel 1 to jam, thus securing the strap 5, while tension upon the strap 5 in the opposite direction will release the cam lock 1 against spring pressure.

A raised ridge or protrusion 17 upon the periphery of the cam 4 parallel to the cam axis 6 but opposite to the point of jamming is positioned such that raising the ridge 17 releases the cam wheel 4. Further raised ridges 18 on the periphery of the cam 4 are positioned parallel to the cam axis 6 along the surface where the face of the surface meets the strap 5 and base 2, providing added gripping strength and friction. Washers 19 are arranged on the pin 7 between the cam 4 and each leg 3.

In FIGS. 5 and 6 the cam lock 1 is shown in association with a tree stand or seat 22. The base plate 2 is secured to a pivot 20. The pivot 20 consists of a generally u-shaped bracket 21 which slides over the edge of platform 22. Each leg 23 of the bracket has two holes 24 through which bolts 25 are inserted, those holes matching holes in the platform 22. The cam lock base plate 2 is secured by bolts 27, nuts 28 and washer 29 to the closed end 30 of the u-shaped bracket 21 through a hole 31 in the end 30 and a hole 32 in the cam lock base 2. Two washers 33 are positioned between end 30 and cam lock base 2 to allow free pivotal movement of the cam lock about an axis parallel to the platform 22 so that the angle of the strap 5 relative to the platform can be adjusted as shown in broken lines FIG. 5. This enables more efficient use of the tree seat. Alternatively, the cam lock base 2 is bolted directly in position on the tree stand 22 by means of bolts inserted through holes at each of the bases' corners.

Figure 9:
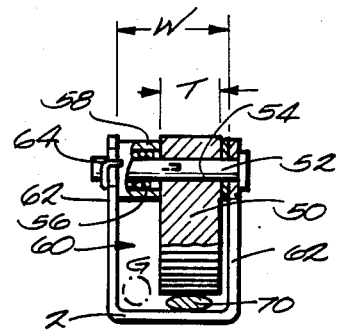
FIG. 9 is a fragmentary sectional view of the cam lock shown in FIG. 8.
Figure 10:
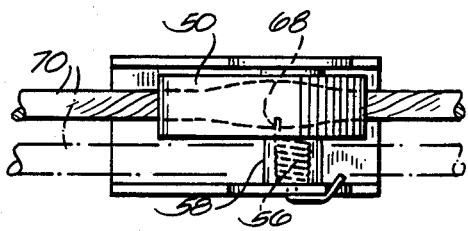
FIG. 10 is a plan view of the cam lock shown in FIG. 8.
Figure 11:
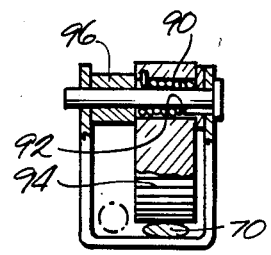
FIG. 11 is a fragmentary sectional view of a further modified embodiment.

FIGS. 8, 9 and 10 show a modified embodiment of the cam lock of the invention in which the cam wheel 50 is pivotally supported by a pin or shaft 52 which has a diameter slightly less than the diameter of through aperture 54 in the cam wheel 50. The spring 56 is located within the bushing 58, both of which are arranged around the pin 52. Bushing or spacer 58 positions the cam wheel 50 at one side of the u-shaped opening 60 and against one leg 62. One end 64 of the spring is engaged in a hole in a leg 62 and the other end of the spring 56 (FIG. 10) is engaged in aperture 68 in the cam wheel 54. The axial length of the bushing 58 and the thickness T of the cam wheel are related to the overall width W of the gap between the legs so as to provide a gap G sufficiently large to accommodate the diameter for a rope 70 which is suitably employed with the cam lock so that the rope can be slipped over to the dotted line position shown in FIG. 9 free of the cam wheel. Hence the rope can be manually manipulated to the dotted line FIG. 9 position to freely raise and lower an anchor for instance. FIG. 11 is a modified embodiment of the arrangement as shown in FIGS. 8, 9 and 10 in which the spring coil 90 is located in aperture 92 in the cam wheel 94. The spring serves as a bearing for the cam wheel and the ends of the spring are engaged one in the cam wheel and one in the leg of the bracket. The spacer or bushing 96 maintains the spring in appropriate axial position and also holds the cam wheel in an appropriate position.

Figure 7:
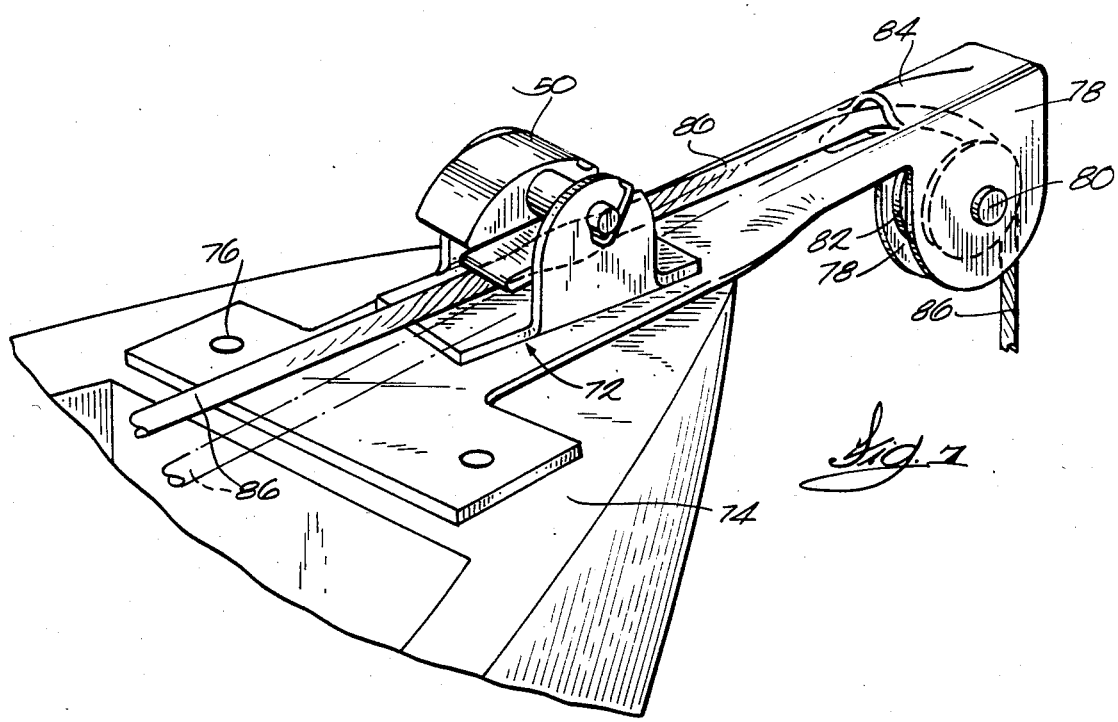
FIG. 7 is a perspective view of use of the cam lock on the bow of a boat for use with an anchor.

In FIG. 7 the cam lock arrangment shown in FIGS. 8, 9 and 10 or FIG. 11 is employed on a T-shaped mounting plate 72 which can be secured to the bow deck 74 of a ship by fasteners extending through apertures 76. The plate 72 is integrally formed with a pair of spaced plate portions 78 having apertures to support a pin 80 for a pulley wheel 82. Also formed in the bracket is a hood 84 which protects the rope 86 from being dislodged from the pulley wheel 82. The cam lock can be utilized with the bracket as shown by manually manipulating the rope under the cam wheel to lock the rope in a fixed position holding the anchor off the ground or above the water. Also the rope can be manually manipulated into the broken line position to position the rope in the slot free of the cam wheel so that it can be released to drop the anchor from a secured position. Alternatively, the cam lock can be mounted inside the boat about a vertical axis for convenience of the operator.

FIGS. 12, 13, 14 and 15 show a modified version of the cam lock in which engagement and release of the cam wheel is afforded by a crank which can be connected to a rope or cable for remote operation thereof. Referring to FIG. 14, a U-shaped mounting bracket 100 is provided with upstanding legs 102 and 104 and a base plate or web portion 106. The cam wheel 108 is supported by a shaft in the form of a bolt 110. Means are provided for adjusting the position of the bolt 110 relative to the base plate 106 to increase the gap between the wheel 108 and the plate to release or grip a rope 112 located therebetween.

In the disclosed construction the means includes apertures 114 in the base plates legs 102 and 104 and bushings 116 which have a hub 118 which rotatably interfits in aperture 114 and is rotatably supported in the aperture 114. The bushings 116 are provided with eccentrically located apertures 120 sized to receive bolt 110 at a point offset from the center 122 of the bushing which would also be the center of the aperture 114. Crank means 124 are provided to rotate the bushings 116 to change the position of the bolt axis 110 and hence the cam wheel 108 relative to the base plate. As disclosed the crank means comprises L-shaped arm portions 125 which are connected by a web portion 126 to form a U-shaped crank. Crank ends 128 are provided with apertures 130 to receive the bolt 110. The end 128 is received in a slot 132 in the face of the bushing 116 which positively positions the crank with respect to the bushing so that there is no relative movement between the crank and bushing.

In operation of the device a rope 136 connected to the web 126 enables movement of the crank from the position shown in FIG. 13 where the cam wheel is engaged with the rope to a released position as shown in FIG. 12 where the gap between the cam wheel has been increased and the cam released from the rope. Changing the position of the crank changes the position of the arc of travel of the periphery of the cam wheel between rope engaging and rope disengaging arcs. Means are provided for securing the crank in a locked or unlocked position. In the disclosed construction the means comprises a pin or plunger 140 secured to a spring leaf 142 which can pop into an aperture 144 or 146 in a leg 102 to secure the crank in a locked or unlocked position.

Although in the disclosed construction in FIGS. 12 and 13 the cam wheel 108 is sized so that it cannot make a 360 degree rotation, a small cam wheel 108 can be employed that can clear the web 106 and rotate 360 degrees. In that situation a larger throw of the offset axis 120 of the bushing would be appropriate.

Whereas the present invention has been described in particular relation to the drawings attached hereto, it should be understood that other and further modifications apart from those shown or suggested herein may be made within the spirit and scope of this invention.

I claim:

1. A cam lock mechanism for a flexible strap or rope or the like comprising a cam wheel having a curved periphery, an aperture eccentrically located with respect to the curved periphery, a bracket including two upstanding legs spaced a distance greater than the thickness of the cam wheel and rope diameter to provide a rope release channel between the cam wheel and one of said legs, and a pin extending through the leg apertures and the aperture in the cam wheel and including a coil spring with the coil spring coil located within said cam wheel aperture, one end of said coil spring being connected to said cam wheel, the other end hooked in an aperture in a leg and including means for positively locating the spring on said pin.

2. The cam locking device of claim 1 wherein said means for locating said spring comprises a bushing located in the cam wheel aperture between one of the bracket legs and the spring.

3. A cam lock mechanism for a flexible strap or rope or the like comprising a cam wheel having a curved periphery, an aperture eccentrically located with respect to the curved periphery, a bracket including two upstanding legs and a pin extending through the leg apertures and the aperture in the cam wheel and including a coil spring with the coil spring coil located within said cam wheel aperture, one end of said coil spring being connected to said cam wheel, the other end hooked in an aperture in a leg and including a bushing for postively locating the spring on said pin and wherein said bushing is located outside said cam wheel aperture and has diameter greater than said cam wheel aperture.

4. A cam lock mechanism for a flexible strap or rope or the like comprising a cam wheel having a curved periphery, an aperture eccentrically located with respect to the curved periphery, a bracket including two upstanding legs and a pin extending through the leg apertures and the aperture in the cam wheel and including a coil spring with the coil spring coil located within said cam wheel aperture, one end of said coil spring being connected to said cam wheel, the other end hooked in an aperture in a leg and including a bushing for positively locating the spring on said pin and in which said spring provides the bearing for said cam wheel.

5. The cam locking device including a bracket with a base plate and two spaced upstanding legs, a cam wheel having an eccentric aperture with respect to a locking surface and a pivot extending through said leg apertures and said cam wheel aperture and a spring located against one face of said cam wheel and against one leg and said space between said bracket legs being greater than the thickness of said cam wheel to provide a free running rope slot adjacent said cam wheel.

6. A cam locking device in accordance with claim 5 wherein said spring is contained within said bushing located between said cam wheel and one of said legs.

7. The cam wheel device of claim 5 including a pulley bracket having integrally formed therein a T-shaped mounting plate and an inverted channel with spaced ears, a pulley wheel supported between the spaced ears and including a hood above said pulley, an aperture beneath the hood to afford communication of a rope through said cam lock and to said pulley.

8. A cam locking device including a bracket having two upstanding leg portions and a web portion, a cam wheel with a curved surface and an axis for said cam wheel eccentrically located with respect to said cam surface and means for adjustably supporting said cam wheel to said legs to afford movement of the axis of said cam wheel between advanced and retracted positions to change the gap between said curved surface and said web to afford release and gripping of said surface on a rope located therebetween.

9. The cam locking device of claim 8 wherein said means for shifting the axis of said cam wheel comprises opposed apertures in said leg portions, bushings rotatably supported in said apertures, an axle for said cam wheel extending through said bushings and said cam wheel, said bushings having eccentrically located apertures with respect to the cylindrical outer surface of said bushings and crank means secured to said bushings to afford movement of said bushings with respect to the web to change the position of the cam wheel axis with respect to the web portion.

10. The cam locking device of claim 9 wherein said crank means has crank portions located in slots in said bushings.

11. A cam lock mechanism for a flexible strap or rope or the like comprising a cam wheel having a curved periphery, an aperture eccentrically located with respect to the curved periphery, a bracket including two upstanding legs and a pin extending through the leg apertures and the aperture in the cam wheel and including a coil spring with the coil spring coil located within said cam wheel aperture, one end of said coil spring being connected to said cam wheel, the other end hooked in an aperture in a leg and including a bushing for positively locating the spring on said pin in combination with a climbing device having a buckle plate and wherein said base plate is mounted to said buckle plate and including a belt having secured to said buckle plate and having a free end movable through said cam lock between said leg portions.

12. A cam lock mechanism for a flexible strap or rope or the like comprising a cam wheel having a curved periphery, an aperture eccentrically located with respect to the curved periphery, a bracket including two upstanding legs and a pin extending through the leg apertures and the apertures in the cam wheel and including a coil spring with the coil spring coil located within said cam wheel aperture, one end of said coil spring being connected to said cam wheel, the other end hooked in an aperture in a leg and including a bushing for positively locating the spring on said pin in combination with a tree seat, brackets on said tree seat and a flexible band, one end connected to one of said brackets, said cam lock connected to the other of said brackets and said band extending through said cam lock and means pivotally mounting said cam lock to one of said brackets.

13. A cam lock in accordance with claim 9 including means for locking said crank means in a fixed position.

* * * * *